Nov. 28, 1961 R. F. J. FILIPOWSKY 3,011,128
TRIPLE COINCIDENCE DETECTOR
Filed May 29, 1958 2 Sheets-Sheet 1

WITNESSES:
Bernard R. Giguere
James F. Young

INVENTOR
Richard F. J. Filipowsky
BY Maury I. Hull
ATTORNEY

United States Patent Office 3,011,128
Patented Nov. 28, 1961

3,011,128
TRIPLE COINCIDENCE DETECTOR
Richard F. J. Filipowsky, Glen Burnie, Md., assignor to Westinghouse Electric Corporation, East Pittsburgh, Pa., a corporation of Pennsylvania
Filed May 29, 1958, Ser. No. 738,729
9 Claims. (Cl. 328—114)

This invention relates to improvements in detector apparatus, and more particularly to improved detector apparatus for separately evaluating three characteristics of the wave form of a signal applied thereto including the energy in the positive and negative alternations and the slope of the signal waveform between alternations, and utilizing coincidence means for providing a detector output only when the three evaluated characteristics meet preselected requirements.

The apparatus described and the invention claimed herein is a further development of the inventive concept of coincidence detection as embodied in apparatus described and as claimed in my copending patent application entitled "Frequency Cycling Signal Apparatus for Coded Communication," filed December 9, 1957, Serial No. 701,547, and assigned to the assignee of the instant invention.

In the first-mentioned copending patent application, there is described a system of communication in which pulsed input signals, such for example as those employed in binary code transmission, are converted to swinging signals having wave forms resembling somewhat a sinusoidal wave form, but preferably differing from exact sine wave shapes and having, for example, a skew-sine wave form or a parabolic skew wave form. These two skew wave forms differ from a sine wave principally in that the slope between alternations has a substantial portion thereof which is linear, and furthermore in that there are small "tails" at the begining and end of a cycle. The linear portion of the slope between alternations may be utilized in decision apparatus, such as the triple coincidence detector of the instant application to assist the detector apparatus in discriminating against spurious signals, deliberate jamming signals, noise, etc. In like manner, the energy contents of the two alternations, in accordance with the areas of the two alternations, are separtely measured or evaluated, and only when the areas have at least predetermined magnitude or values is a signal considered to be present and a detector output provided, thereby further providing for discrimination against noise, spurious signals, and deliberate jamming attempts.

In summary, the apparatus of the instant invention includes three channels operatively connected to the same input lead means for separately evaluating the three signal characteristics. Two channels for evaluating the areas of the alternations include separate detectors for the positive and negative alternations, each of which applies its output to an integrating circuit followed by a peak clipper circuit, the output of which keys a multivibrator. The output of one multivibrator is applied directly to a first coincidence circuit, whereas the output of the other multivibrator is applied to the first coincidence circuit only after a delay correspondning to the time interval of one alternation, or one-half of the total time interval required for the signal wave form. The third channel evaluates the slope of the signal wave form between alternations, and includes a slicer circuit followed by a differentiator, the output of which is applied to both a negative clipper and a positive clipper, the output of one of which after delay is applied to the first coincidence circuit. Only when the first coincidence circuit has applied thereto three inputs in the desired time relationship or coincidence is an output provided. A similar second coincidence circuit is provided having the output of the other clipper in the third channel applied thereto after delay, and also having inputs thereto derived from the two detectors of the first mentioned two channels, for providing an output pulse when the three inputs thereto are in desired time coincidence. A signal applied to the input lead means including a positive followed by a negative alternation gives an output pulse from one coincidence circuit, and an input signal having a negative alternation followed by a positive alternation gives a pulse output from the other coincidence circuit. The two types of input singals may if desired correspond to a binary one and a binary zero.

Accordingly, a primary object of the instant invention is to provide new and improved detector apparatus.

Another object is to provide a new and improved triple coincidence detector circuit.

A further object is to provide a new and improved detector circuit having means for separately evaluating a plurality of signal characteristics of the signal applied to the detector circuit and providing a detector output only when all of the signal characteristics meet preselected specifications.

Still a further object is to provide new and improved detector apparatus in which swinging signals resembling sine wave signals but having a linear portion in the wave form between alternations selectively provide one of two detector outputs in accordance with whether the signal input comprises a negative alternation followed by a positive alternation or a positive alternation followed by a negative alternation.

Still a further object is to provide new and improved detector apparatus having circuit means for providing an output only when signals appear at expected times at circuit elements under the control of clocking apparatus.

Other objects and advantages will become apparent after a study of the following specification when read in connection with the accompanying drawings, in which:

FIGS. 3A and 3B are graphs illustrating the operation of the apparatus of FIGS. 1 and 2.

Figure 1:
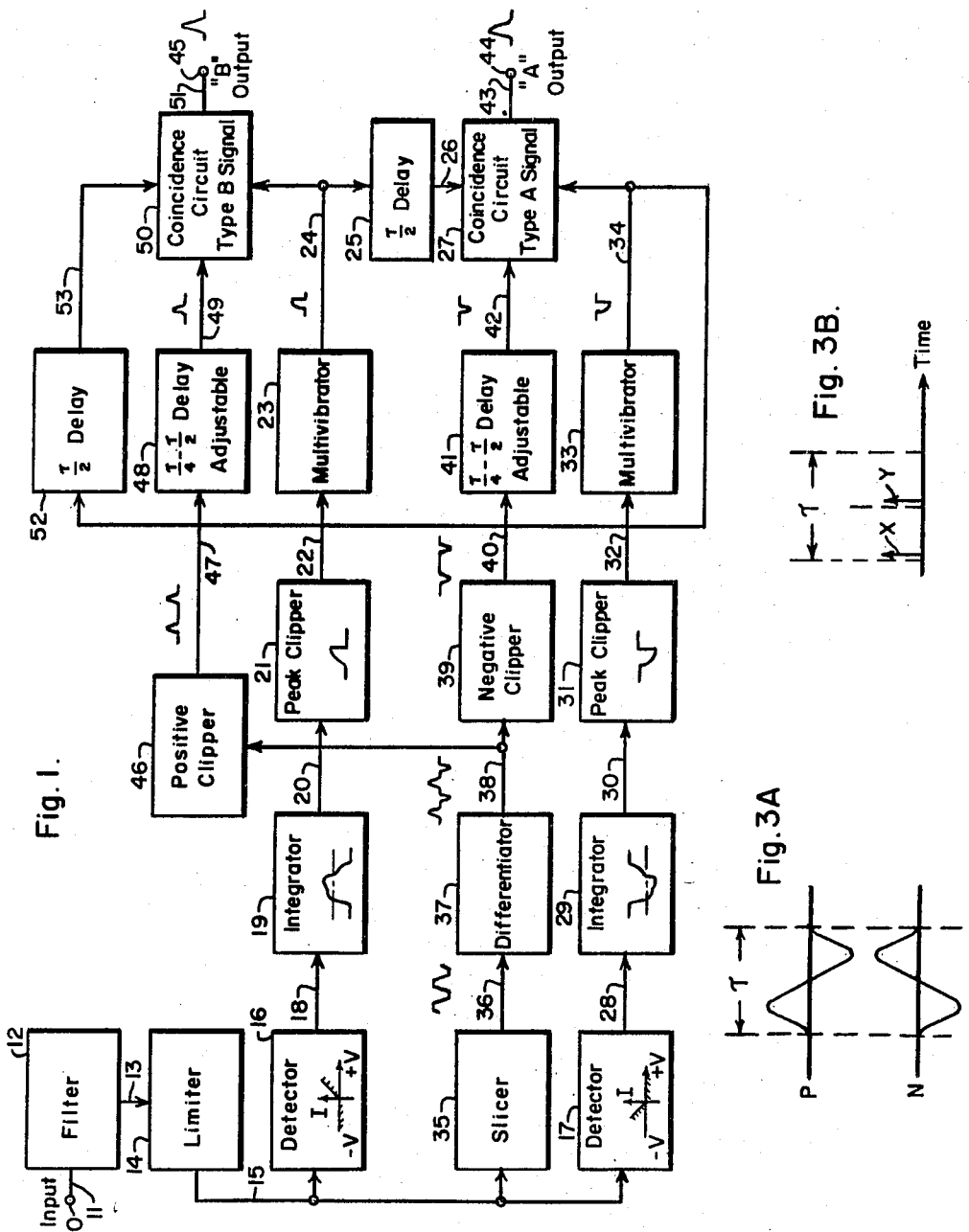
FIGURE 1 is a block diagram of apparatus according to the preferred embodiment of the invention.

Particular reference should be made now to the drawings, in which like reference numerals are used throughout to designate like parts, for a more detailed understanding of the invention and in particular to FIG. 3A thereof. Curves P and N of FIG. 3A illustrate the wave form of signals applied to the input terminal 10 of the detector apparatus, FIG. 1. In curve P of FIG. 3A it will be noted that the signal has a positive followed by a negative alternation and that the slope of the wave form between alternations has an extended portion which is substantially linear, and furthermore that the wave form departs to some extent in another manner from a sine wave as a result of "tails" at the beginning and end of the cycle wave form. The time interval τ represents the time required for one complete cycle of the input signal. Curve N shows a negative alternation followed by a positive alternation. The two signals at curves P and N may represent, for example, a binary 1 and a binary 0.

In FIG. 1, to which particular attention is directed, it is seen that input terminal 10 is connected by lead means 11 to supply an input to a filter circuit shown in block form and generally designated 12. The input at terminal 10 may be obtained from a detector which may be either for amplitude modulated or frequency modulated signals; the input at terminal 10 may be an audio signal. The filter 12, which may be dispensed with if desired, is a low pass filter of any convenient design. If a skew-sine signal is used at input terminal 10, filter 12 may pass a band from about 0.1 to about 1.9 times the fundamental frequency of the skew-sine signals. The output of the filter 12 is supplied by lead means 13 to a double sided peak limiter circuit of any convenient design shown in block form at 14 and constructed and arranged to clip off noise peaks exceeding in amplitude the positive or negative peak values of the genuine signals applied thereto. The output of the limiter 14 is applied by lead means 15 to two detectors shown in block form and designated 16 and 17 for separately rectifying the signal and detecting the positive and negative portions respectively of the signal applied thereto from limiter 14. The output of detector 16, which as aforementioned is the positive detector, is applied by lead means 18 to an integrator circuit of any convenient design shown in block form and designated 19. Integrator 19 in effect evaluates the energy in the positive alternation, which may be distorted in transmission from its pure or ideal wave form by a number of influences including noise or spurious signals, by integrating over the area of the positive alternation. The output of integrator 19 is applied by lead means 20 to a peak clipper, shown in block form and designated 21, and the output of the peak clipper 21 is applied by lead means 22 to trigger a multivibrator shown in block form at 23. The output of the multivibrator 23 is a pulse which is applied by lead means 24 to a delay circuit shown in block form and designated 25, provided for delaying the pulse on lead means 24 by a time interval corresponding to $$\frac{\tau}{2}$$

The output of the delay circuit 25 is applied by lead means 26 as an input to a coincidence circuit shown in block form and designated 27, coincidence circuit 27 to be hereinafter more fully described.

As aforementioned, the detector 17, which may be similar to detector 16, is provided for also rectifying the signal and detecting the negative portion of the applied wave on lead means 15, and the output of the detector 17 is applied by way of lead means 28 to an integrator circuit shown in block form and designated 29. Integrator 29 may be similar to integrator 19. The output of the integrator 29 is applied by lead means 30 to a peak clipper circuit shown in block form at 31 and which may be similar to peak clipper 21; the output of clipper 31 is applied by lead means 32 to a multivibrator shown in block form at 33. Multivibrator 33 may be similar to aforementioned multivibrator 23. Multivibrator 33 supplies an output pulse on lead means 34 which is applied as an input to the aforementioned coincidence circuit 27 for reasons which will be more fully explained hereinafter.

The aforementioned signal on the aforementioned output lead 15 from aforementioned limiter 14 is also applied to double sided slicer circuit shown in block form at 35, this being of any convenient design. The slicer circuit 35 is provided to remove the top portions of both the positive and negative alternations of the input signal applied thereto so that only the central portion of the signal wave form which is characterized by a substantially linearly slope between alternations is applied on lead means 36 to a differentiator circuit shown in block form at 37, this differentiator circuit being of any convenient design and providing an output means 38 a differentiator output which is a series of pips or pulses of alternately positive and negative polarity, there being one pip or pulse for each time the signal on lead 36 crosses its zero axis. The differentiator output signal on lead means 38 is applied to a negative clipper circuit shown in block form at 39, the output of which on lead means 40 consists of only the negative pulses in the output of the differentiator 37, or portions of these pulses. These nega-
tive pulses on lead means 40 are applied to a delay circuit shown in block form and designated 41, which is preferably constructed and arranged to provide an adjustable delay which may be varied from a relatively short delay corresponding to the time interval $$\frac{\tau}{4}$$

to a somewhat longer delay corresponding to the time interval $$\frac{\tau}{2}$$

The output of the delay circuit 41 is applied by lead means 42 directly to the aforementioned coincidence circuit 27, providing a third input to the coincidence circuit. The coincidence circuit 27 is constructed and arranged on lead means 43 an output pulse for output terminal 44 when and only when the three pulse inputs thereto on lead means 26, 34 and 42 are in substantial time coincidence.

The operation of this portion of the circuit of FIG. 1 will readily be understood by reference to the graph P of FIG. 3A. It should be recalled that this portion of the circiut of FIG. 1 is constructed and arranged to provide an output pulse at terminal 44 only when a signal is applied to input terminal 10 which has a wave shape substantially as that shown in curve P of FIG. 3A, that is, a positive alternation followed by a negative alternation, both of these alternations being of at least a predetermined amplitude and/or area, and when the slope of the wave form between alternations has a substantial linear portion. To accomplish this, the output of the positive detector 16 after integration at 19 and peak clipping at 21 keys a multivibrator circuit 23 which applies to lead means 24 a pulse. This pulse on lead means 24 occurs at substantialy the instant that the positive alternation attains its peak value, although there may be some variation in the time relationship. The negative alternation of the signal of curve P of FIG. 3A as aforementioned is passed by detector 17 to integrator 29, the output of which is clipped at 31 and utilized to key a multivibrator 33 which generates a pulse and applies this pulse on lead means 34 at substantially the instant that the negative alternation attains its maximum value. It will be noted by reference to FIG. 3A that according to the true or ideal wave form the instants when the positive and negative alternations attain their maximum values are separated by a time interval of substantially $$\frac{\tau}{2}$$

and accordingly, the multivibrator pulse output on lead means 24 is delayed by an interval $$\frac{\tau}{2}$$

by the delay circuit 25 before application by lead means 26 to the coincidence circuit 27, with the result that the pulses on lead means 24 and 34 corresponding in time approximately to the peaks of the positive and negative alternations of curve P of FIG. 3A arrive at the coincidence circuit 27 in substantial time coincidence on lead means 26 and 34, respectively.

As explained hereinbefore, the apparatus is adapted to separately evaluate three characteristics of the input signal to ascertain whether a coincidence circuit output signal should be provided, and one of these characteristics is the slope between alternations. Accordingly, the differentiator 37 is provided and supplies positive pips on lead means 38 for each time the signal at input 10 and lead means 36 crosses the zero axis from a negative to a positive value, that is, in a positive-going direction, and the differentiator 37 applies on lead means 38 a negative pip each time the signal on lead means 36 crosses the zero axis in a negative-going direction, or from positive to negative. By reference to curve P it will be noted that the signal has a negative going slope between alternations, and accordingly, the negative pips on lead 38 are passed by negative clipper 39 to lead means 40. It will be noted further by reference to curve P of FIG. 3A that the time interval between the instant when the curve of the signal illustrated by curve P crosses its zero axis and the instant that the negative alternation attains a maximum value is substantially $$\frac{\tau}{4}$$

and accordingly, the output of negative clipper 39 on lead 40 is delayed by the delay circuit of block 41 and is applied to lead means 42 so that the pulse on lead means 42 arrives at coincidence circuit 27 in substantial time coincidence with the pulses applied thereto by lead means 26 and 34. The time delay at block 41 is preferably made adjustable so that the actual delay may be adjusted in accordance with the thresholds at which the integrators 19 and 29 operate. If this threshold is relatively high the delay in block 41 may be adjusted towards its maximum value of $$\frac{\tau}{2}$$

whereas if the thresholds are low the delay at 41 may be adjusted to the theoretical desired value of $$\frac{\tau}{4}$$

There arrive then at the coincidence circuit 27 three pulses in substantial time coincidence if the signal at input terminal 10 has a wave shape corresponding to curve P of FIG. 3A and has alternations of at least a predetermined minimum amplitude and/or area, and the coincidence circuit 27, which may be of any convenient design, is constructed and arranged to provide an output pulse on lead 43 to output terminal 44 when the inputs thereto are coincident. The circuit 27 may be constructed and arranged to utilize pulses of any convenient polarity on the three input lead means 26, 42 and 34.

If a small error rate is required at the cost of a higher failure rate, multivibrators 23 and 33 will be selected or adjusted to provide output pulses of relatively short duration, whereas if a smaller failure rate accompanied by a larger error rate is desired, multivibrators 23 and 33 will be selected or adjusted to provide pulses of relatively long duration.

An additional portion of the circuit of FIG. 1 is constructed and arranged to supply an output pulse at an additional output terminal 45 when the signal applied to the input terminal 10 has a wave shape such as that illustrated by curve N of FIG. 3A, in which the polarities of the alternations are reversed from those shown in curve P, that is, when there is negative alternation followed by a positive alternation with a linear slope between alternations. To accomplish this, a positive clipper circuit is provided and is shown in block form at 46, and which has the output of the differentiator 37, as applied to lead means 38, applied thereto. The output of the positive clipper 46 on lead means 47 is a series of pulses or pips of positive polarity corresponding in time to the positive pips or pulses on lead means 38, which as aforementioned occur wherever the signal on leads 11 and 36 crosses the zero axis in a positive-going direction, and these positive pulses on lead 47 are applied to a delay circuit shown in block form and designated 48 where they are delayed by a preferably adjustable interval of time having a minimum value corresponding to $$\frac{\tau}{4}$$

and a maximum value corresponding to $$\frac{\tau}{2}$$

The output of the delay circuit 48 is applied by lead means 49 to a second coincidence circuit 50 which supplies an output pulse by lead means 51 to the aforementioned output terminal 45 under certain conditions to be hereinafter described.

As previously explained, a pair of multivibrators 23 and 33 provide output pulses on lead means 24 and 34 respectively at times corresponding substantially to the peaks of the alternations which are positive and negative respectively. The multivibrator output on lead means 24 is applied directly to the coincidence circuit 50 as a second input, whereas the multivibrator output on lead means 34 is applied to a delay circuit shown in block form and designated 52 where the pulse is delayed by a time interval corresponding to $$\frac{\tau}{2}$$

and is thence applied by lead means 53 to the coincidence circuit 50.

The operation of the coincidence circuit 50 will be readily understood by reference to the curve N of FIG. 3A. The multivibrator 23 responsive to the output of the positive detector 16 as aforementioned provides a pulse on lead 24 which is applied directly to the coincidence circuit 50. The multivibrator 33, which is energized from detector 17 in response to the negative alternation, has the maximum value of the alternation occurring at substantially a time interval corresponding to $$\frac{\tau}{2}$$

ahead of the positive alternation, so that the output of the multivibrator 33 on lead means 34 is delayed at 52 by time interval $$\frac{\tau}{2}$$

before it is applied by lead means 53 to the coincidence circuit 50, arriving at 50 in substantial time coincidence with the pulse on lead means 24. In like manner, the positive clipper 46 provides a pulse on lead means 47 each time the signal on input terminal 10 crosses the zero axis in a positive-going direction, as illustrated by the curve N, FIG. 3A, and in accordance with the wave form of curve N under ideal conditions the positive peaks obtained from the differentiator 37 occur at substantially a time interval $$\frac{\tau}{4}$$

ahead of the peak of the positive alternation, with the result that the output of the positive clipper 46 is delayed by delay nework or delay circuit 48 a suitable time interval which may be $$\frac{\tau}{4}$$

and is thence applied by lead means 49 to the coincidence circuit 50, arriving in time coincidence with the pulses on lead means 24 and 53. Coincidence circuit 50 is adapted to utilize pulses of any convenient polarity on all three of the input lead means thereto, and when these three pulses are in substantial time coincidence to provide on output lead means 51 an output pulse for application to the output terminal 45. The delay at 48 is preferably made adjustable and is preferably varied in accordance with variations in the thresholds at which the integrators 19 and 29 operate, as was previously explained in connection with the adjustable delay circuit 41. Accordingly, an output pulse occurs at output terminal 45 when and only when the input signal to terminal 10 is a negative alternation followed by a positive alternation of at least a predetermined area and/or a predetermined amplitude and the slope betwen alternations has a linear portion which is utilized by the differentiator 37.

There has been provided, then, in the apparatus of FIG. 1 a circuit for evaluating the characteristics of two signals which correspond to, for example, a binary 1 and a binary 0, and providing outputs labeled "A" and "B" respectively whenever these input signals meet predetermined specifications as to their characteristics, as measured by characteristic ascertaining circuits and apparatus heretofore described.

The multivibrators 23 and 33 may be eliminated if desired and the outputs of the peak clippers 21 and 31 respectively applied directly to the leads 24 and 34 respectively, and may ultimately be utilized by the coincidence circuits 27 and 50.

As will be readily understood by those skilled in the art, a differentiator circuit may be selected for use at 37 which will have peaks or pulse outputs which have an amplitude which is proportional to the slope of the applied wave form, so that the circuit of FIG. 1 has no substantial outputs from one or both of the clippers 39 and 46 when the slope of the wave form between alternations of the signal applied to input terminal 10 does not have at least a predetermined minimum value, so that the detector circuit of FIG. 1 under such circumstances provides no output at one or both of the output terminals 44 and 45.

If desired, and or all of the threshold devices or clippers 31, 39, 21 and 46 may be eliminated from the circuit of FIG. 1. The result of such elimination would be to substantially increase the error rate and make the circuit more susceptible to jamming attempts, spurious signals, and noise, while at the same time reducing the failure (no output signal) rate.

Integrators 19 and 29 may be eliminated if desired, and such elimination may be desirable where no distortion of the signal wave form occurs in transmission, the peak clippers 21 and 31 providing for coincidence circuit outputs when the positive and negative alternators have at least predetermined amplitudes and occur in the specified time relationship.

If desired, a multivibrator, not shown, may be interposed in lead 42, FIG. 1, and may be similar to multivibrators 23 and 33.

If desired, the limiter 14 may have a manually or automatically adjustable threshold, which may be adjusted so that an increase in the failure rate causes the limiter to widen its range.

Figure 2:
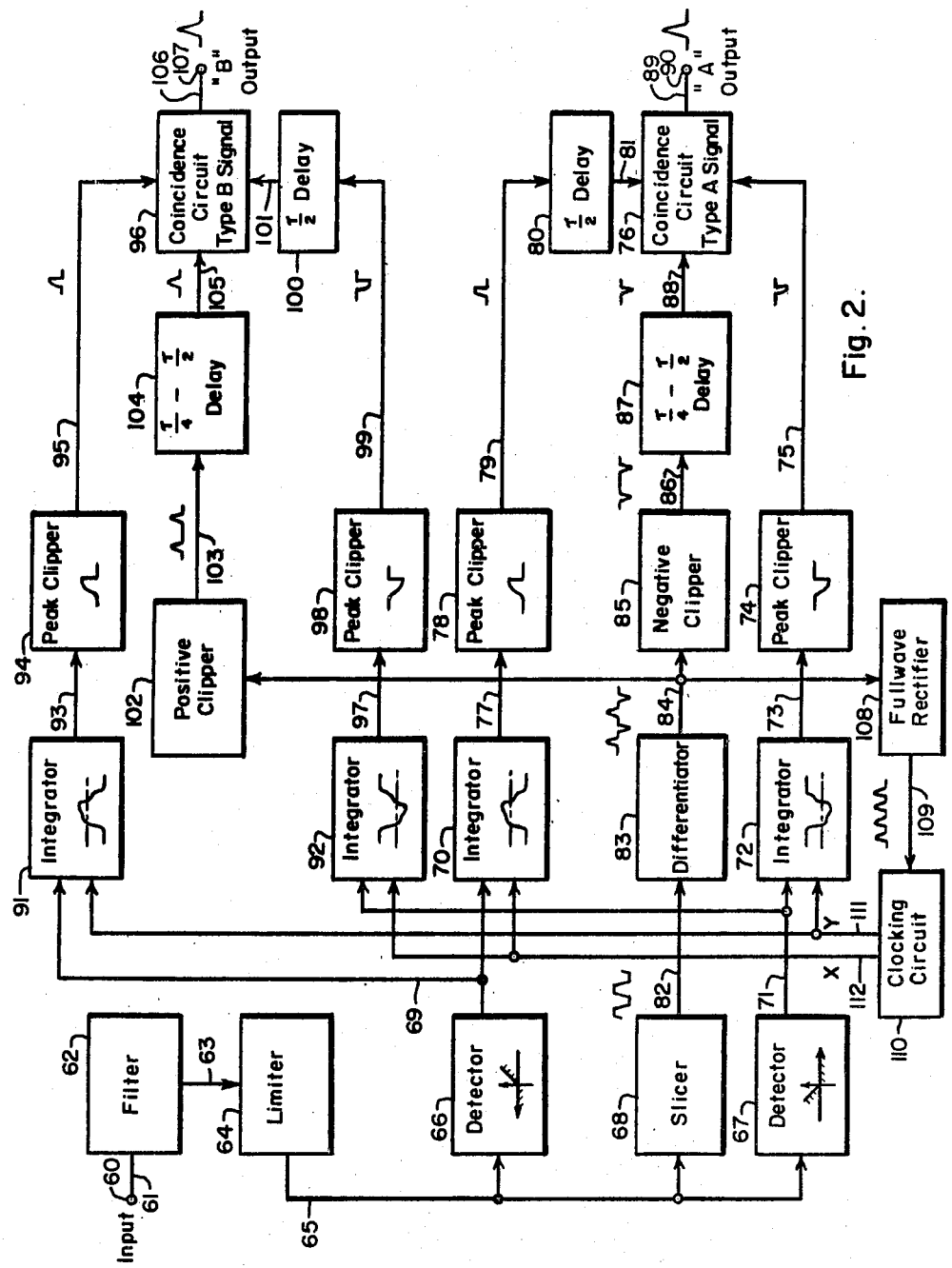
FIG. 2 is a block diagram of the invention according to a second embodiment thereof.

Particular reference should be made now to FIG. 2 in which a second embodiment of the invention is shown. The apparatus of FIG. 2 is similar to the apparatus in FIG. 1, but includes a clocking circuit for producing sampling pulses for gating and controlling the operation of integrator apparatus which performs a function similar to the function of the integrator apparatus shown in FIG. 1. These gating pulses provide that the integrators integrate only over the half waves or alternations in a particular branch for a particular type of signal. The apparatus of FIG. 2 is especially suitable for use when an input signal having known times of arrival is applied to the circuit, and the clocking feature of the apparatus of FIG. 2 provides an additional means for the elimination of error and the elimination of outputs which might result from spurious inputs, from noise, or from jamming signals applied to the detector circuit.

In FIG. 2 the input at the input terminal 60 is applied by lead means 61 to a filter 62, which may be similar to the filter 12 of FIG. 1. The output of the filter 62 is applied by lead means 63 to a limiter circuit 64, which may be similar to the limiter 14 of FIG. 1, and the output of the limiter circuit 64 is applied by lead means 65 to a pair of detectors 66 and 67, which may be similar to the aforedescribed detectors 16 and 17 respectively of FIG. 1, the signal on lead means 65 also being applied to a slicer shown in block form at 68, slicer 68 being if desired similar to the aforedescribed slicer 35 of FIG. 1. The output of detector 66 is applied by lead means 69 to an integrator circuit shown in block form at 70, while the output of the detector 67 is applied by lead means 71 to an integrator shown in block form at 72. The output of integrator 72 is applied by lead means 73 to a peak clipper circuit shown in block form at 74, and the output of the peak clipper circuit 74 is applied by lead means 75 to a coincidence circuit shown in block form at 76. In like manner, the output of the aforementioned integrator 70 is applied by lead means 77 to a peak clipper circuit shown in block form at 78, and the output of the peak clipper 78 is applied by lead means 79 to a delay circuit shown in block form at 80 where the signal on lead means 79 is delayed by a time interval corresponding to $$\frac{\tau}{2}$$

and is then applied by lead means 81 to the aforementioned coincidence circuit 76.

The output of the aforementioned slicer 68, which cuts off the peaks of both the positive and negative alternations of the signal applied thereto, leaving only the portion of the signal having a substantially linear slope between alternations, is applied by lead means 82 to a differentiator circuit shown in block form at 83. As will be readily understood by those skilled in the art, the output of the differentiator circuit 83 on lead means 84 is a series of sharp pulses of alternate negative and positive polarity, the pulses being coincident with the instants when the signal applied to the differentiator passes through the zero axis, the positive pulses occurring when the signal passes through the zero axis in a positive-going direction, and the negative pulses occurring when the signal passes through the zero axis in a negative-going direction. The signal on lead 84 is applied to a negative clipper circuit shown in block form at 85, the output of which constitutes or consists of only the negative pulses in the wave form applied thereto, and the output of the negative clipper 85 is applied by lead means 86 to a delay circuit 87 which is preferably constructed and arranged to provide an adjustable delay which may be varied from a minimum delay corresponding to $$\frac{\tau}{4}$$

to a maximum delay corresponding to the time interval $$\frac{\tau}{2}$$

the output of the delay circuit 87 being applied by lead means 88 to the aforementioned coincidence circuit 76. The coincidence circuit 76 is constructed and arranged to provide an output lead means 89 an output pulse when the three inputs thereto on the aforementioned leads 75, 81 and 88 are in substantial time coincidence. The coincidence circuit 76 may be of any convenient design and constructed to use any desired pulse polarities on the aforementioned three input leads. The output signal on output lead 89 is applied to the output terminal 90.

In FIG. 2 an additional pair of integrators 91 and 92 are provided which are also energized by way of the aforementioned leads 69 and 71 respectively by the outputs of detectors 66 and 67 respectively. The output of the integrator 91 is applied by lead means 93 to a peak clipper circuit shown in block form at 94, the output of peak clipper 94 being applied by lead means 95 to an additional coincidence circuit shown in block form at 96. The output of the aforementioned integrator 92 is applied by lead means 97 to a peak clipper 98, which has the output thereof on lead means 99 delayed at delay circuit 100 by a time interval corresponding to the time $$\frac{\tau}{2}$$

and thence applied by lead means 101 to the aforementioned coincidence circuit 96.

The aforementioned differentiator 83 also has the output thereof on lead means 84 applied to a positive clipper circuit 102 where the negative pulses in the output of the differentiator 83 are eliminated and the positive pulses applied by lead means 103 to a delay circuit 104 which preferably provides an adjustable delay which may be varied from a time corresponding to $$\frac{\tau}{4}$$

to a maximum time corresponding to $$\frac{\tau}{2}$$

and thence the signal is applied by lead means 105 to the aforementioned coincidence circuit 96. The coincidence circuit 96 is constructed and arranged to provide on lead means 106 and output terminal 107 a pulse when the three pulse inputs thereto on the aforementioned three leads 95, 101, 105 are in substantial time coincidence.

As stated hereinbefore, the apparatus shown in FIG. 2 has the additional feature of a clocking circuit for timing the integrator devices to insure that the integrators are responsive to signals which arrive only at expected times and are not responsive to other signals, thereby making the circuit of FIG. 2 additionally secure against jamming and spurious signals at the input terminal 60. To this end, the output of the differentiator 83 as developed on the aforementioned lead means 84 is applied to a full wave rectifier circuit of any convenient design shown in block form at 108, and the output of the rectifier 108 is applied by lead means 109 to a clocking circuit shown in block form at 110. Two sampling or gating pulse outputs are provided by the clocking circuit 110, and which are spaced from each other by a predetermined time interval, as will be readily understood by those skilled in the art, one of these outputs being applied to output lead 111 the pulses on which clock and control the operation of the aforementioned integrators 72 and 91, and one of the outputs of clocking circuit 110 being applied to output lead 112, the pulses on which clock and control the operation of the aforementioned integrators 70 and 92.

Particular reference should be made now to FIG. 3B, which illustrates the operation of the apparatus of FIG. 2. On the horizontal coordinate which represents time a distance $\tau$ is measured corresponding to the distance $\tau$ in FIG. 3A already referred to, and the arrows X and Y, FIG. 3B, indicate the relative times of occurrence of the pulses on the aforementioned leads 112 and 111 respectively, FIG. 2, these pulses starting the operation of the integrator circuits connected thereto. It should be noted that the gating pulse on lead 112 gates one positive integrator and one negative integrator, and that the gating pulse on lead 111 gates the other positive integrator and the other negative integrator, for as previously explained, the first alternation of the input signal may be either positive or negative. It will be seen, then, that the integrator circuits of FIG. 2 are operative only during selected time intervals which correspond to the time intervals that the two alternations of an input signal on lead 60 would occur if the desired type of signal is applied thereto, with the result that no output is obtainable at either terminals 90 or 107 for signals applied to input terminal 60 which do not occur at expected times and which are not utilized by the integrator circuits under the control of the clocking circuit.

There has been provided, then, in the apparatus of FIG. 2, a circuit for evaluating the aforementioned three characteristics of the input signal applied to terminal 60, that is, the areas or peak values of the alternations or the amounts of energy in the alternations and the slope of the signal wave form between alternations, and in addition the apparatus of FIG. 2 is rendered unresponsive to input signals which do not occur at expected or preselected times, providing as aforementioned additional means for obviating the effects of jamming attempts and providing additional security of communication.

If desired, four multivibrators similar to the multivibrators 23 and 33 of FIG. 1 may be interposed in the leads 95, 99, 79 and 75 of FIG. 2, having the pulse outputs of the multivibrators under the time control of the pulses in the outputs of the peak clippers 94, 98, 78 and 74, respectively.

As stated hereinbefore, it is possible to adjust the detector for a given ratio between failure rate and error rate by varying the pulse width of the multivibrators and/or the level of the decision thresholds.

The apparatus shown in FIG. 2 offers several advantages where there is a constant signaling rate such, for example, as in teletype or data transmission. The integrators may start integrating from a neutral (zero) condition and may be again discharged to this condition at the end of a half wave. The integrators may be blocked during those half waves where no energy can be expected for a particular signal. The apparatus of FIG. 2 includes further measures for eliminating frequency and amplitude ranges, where no signal energy could be reasonably expected.

The apparatus of FIG. 1 may be particularly suitable for use in radar data transmission, where the time of arrival of the signal is not known.

If desired, four detector circuits may be provided for the respective four integrator circuits of FIG. 2, and the four detector circuits also controlled by gating or clocking pulses from clocking circuit 110.

Both of the embodiments of the invention, as shown in FIGS. 1 and 2, may be provided with means of any convenient design, not shown, for adjusting the decision thresholds of each criterion or signal characteristic ascertaining device separately, to allow improved matching to particular noise or jamming conditions.

If desired, the apparatus, for example, that of FIG. 1, may be modified by omitting the slope-evaluating channel, and utilizing coincidence detectors which give outputs when two pulse inputs in time coincidence are applied thereto, in which case sinusoidal wave forms may be utilized at input terminal 10.

Whereas the invention has been shown and described with respect to two embodiments thereof which give satisfactory results it should be understood that changes may be made and equivalents substituted without departing from the spirit and scope of the invention.

I claim as my invention:

1. In a detector apparatus for detecting a signal having a waveform with a first and second portion of opposite polarity, means for measuring the area of said first portion, means for measuring the area of said second portion, and output means for providing an output signal when both said first and second portions exceed a predetermined area.

2. In a detector apparatus for detecting a signal having a waveform with first and second portions of opposite polarity, the end of said first portion and the beginning of said second portion forming a linear slope, means for measuring the area of said first portion, means for measuring the area of said second portion, means for measuring said linear slope, and output means for providing an output signal when said linear slope and the areas of said first and second portions exceed predetermined values.

3. In a detector apparatus for detecting signals having a positive alternation followed by a negative alternation or a negative alternation followed by a positive alternation, means providing an output signal in response to a signal having a positive alternation followed by a negative alternation when the areas of said positive and negative alternations exceed predetermined values, means providing an output signal in response to a signal having a negative alternation followed by a positive alternation when the areas of said negative and positive alternations both exceed a predetermined value.

4. In a detector apparatus for detecting a signal having a waveform with a first and second portion, said first and second portion forming a substantially linear slope therebetween, means for measuring the area of said first and second portions, another means for measuring said slope, and an output means responsive to said means and said other means to produce an output signal when said slope in the areas of said first and second portions exceed predetermined values.

5. In a detector apparatus for detecting a signal having a waveform with a first and second portion of opposite polarity, means for measuring the area of said first portion including integrating means for integrating said first portion and threshold means for producing an output signal when the integrated signal exceeds a predetermined threshold of the first polarity, means for measuring the area of said second portion including integrating means for integrating said second portion and threshold means for producing an output signal when the integrated signal exceeds a predetermined threshold of an opposite polarity, an output means for producing an output signal when both said first and second portions exceed a predetermined area.

6. In a detector apparatus for detecting a signal having a waveform with a first and second portion of opposite polarity, the end of said first portion and the beginning of said second portion forming a linear slope, means for measuring the area of said first portion including integrating means for integrating said first portion and threshold means for producing an output signal when said integrated first portion exceeds a predetermined threshold of a first polarity, means for measuring the area of said second portion including integrating means for integrating said second portion and threshold means for producing an output signal when said integrated second portion exceeds a predetermined threshold of an opposite polarity, means for measuring said linear slope including differentiating means for differentiating said waveform in threshold means for producing an output signal when said differentiated waveform exceeds a predetermined threshold, an output means for providing an output signal when said linear slope in the areas of said first and second portions exceed predetermined values.

7. In a detector apparatus for detecting a signal having a bipolar waveform comprising, means for measuring the area of said waveform having a first polarity, means for measuring the area of said waveform having an opposite polarity, an output means for providing an output signal when the area of said waveform of said first polarity and of the opposite polarity exceed a predetermined value in a predetermined time sequence and spacing.

8. In a detector apparatus for detecting a signal having a waveform with a first and second portion of opposite polarity, means for measuring the area of said first portion including integrating means for integrating said waveform and threshold means for producing an output signal when the integrated waveform exceeds a predetermined threshold of a first polarity, means for measuring the area of said second portion including integrating another integrating means for integrating said waveform and threshold means for producing an output signal when said integrated waveform exceeds a predetermined threshold of an opposite polarity, and output means for producing an output signal when said threshold means and said other threshold means occur in a predetermined timed sequence and spacing.

9. In a detector apparatus for detecting a signal having a waveform with first and second portions of opposite polarity, the end of said first portion and the beginning of said second portion forming a substantially linear slope, means for measuring the area of said first portion including integrating means for integrating said waveform and threshold means for producing an output signal when the integrated waveform exceeds a predetermined threshold of a first polarity, means for measuring the area of said second portion including another integrating means for integrating said waveform and threshold means for producing an output signal when the integrated waveform exceeds a predetermined threshold of an opposite polarity, means for measuring said slope including differentiating means and threshold means for providing an output signal when the output of said differentiating means exceeds a predetermined level, and output means for providing an output signal when the output of said three threshold means occurs in a predetermined time sequence and spacing.

References Cited in the file of this patent

UNITED STATES PATENTS

| | | |
|---|---|---|
| 2,446,244 | Richmond | Aug. 3, 1948 |
| 2,465,925 | Purlington | Mar. 29, 1949 |
| 2,493,648 | Watton et al. | Jan. 3, 1950 |
| 2,541,038 | Cleeton | Feb. 13, 1951 |
| 2,700,149 | Stone | Jan. 18, 1955 |
| 2,756,336 | Christensen | July 24, 1956 |